United States Patent
Etoh et al.

(10) Patent No.: US 9,142,227 B1
(45) Date of Patent: Sep. 22, 2015

(54) MICROWAVE ASSISTED MAGNETIC RECORDING (MAMR) WRITE HEAD AND SYSTEM

(71) Applicant: HGST Netherlands B.V., Amsterdam (NL)

(72) Inventors: Kimitoshi Etoh, Odawara (JP); Masahiko Hatatani, Kamakura (JP); Kazuhiko Hosomi, Fujisawa (JP); Yohji Maruyama, Iruma (JP); Kenji Sugiura, Odawara (JP); Mikito Sugiyama, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/480,394

(22) Filed: Sep. 8, 2014

(51) Int. Cl.
*G11B 5/127* (2006.01)
*G11B 5/31* (2006.01)

(52) U.S. Cl.
CPC ............ *G11B 5/1278* (2013.01); *G11B 5/3133* (2013.01)

(58) Field of Classification Search
CPC ...... G11B 5/127; G11B 5/1278; G11B 5/147; G11B 5/17; G11B 5/187; G11B 5/23; G11B 5/245; G11B 5/31; G11B 5/3109; G11B 5/3133; G11B 5/3143
USPC ............... 360/125.3, 125.31, 125.06, 125.16, 360/125.27, 125.28, 125.29, 125.03
See application file for complete search history.

(56) References Cited

U.S. PATENT DOCUMENTS

| | | | |
|---|---|---|---|
| 6,785,092 B2* | 8/2004 | Covington et al. | 360/125.45 |
| 8,027,110 B1 | 9/2011 | Yamanaka et al. | |
| 8,270,112 B2 | 9/2012 | Funayama et al. | |
| 8,279,548 B2* | 10/2012 | Tsuchiya et al. | 360/59 |
| 8,300,346 B2 | 10/2012 | Ikeda et al. | |
| 8,363,355 B2 | 1/2013 | Mochizuki et al. | |
| 8,373,940 B2* | 2/2013 | Maruyama et al. | 360/59 |
| 8,456,962 B2 | 6/2013 | Yamane et al. | |
| 8,582,225 B2 | 11/2013 | Shiimoto et al. | |
| 8,705,204 B2* | 4/2014 | Taguchi et al. | 360/125.12 |
| 8,953,273 B1* | 2/2015 | Funayama | 360/68 |
| 2008/0137224 A1 | 6/2008 | Gao et al. | |
| 2009/0080120 A1* | 3/2009 | Funayama et al. | 360/319 |
| 2013/0083423 A1 | 4/2013 | Shiroishi et al. | |
| 2014/0340782 A1* | 11/2014 | Ajioka | 360/59 |
| 2015/0146324 A1* | 5/2015 | Yamada | G11B 5/35 |

OTHER PUBLICATIONS

J. G. Zhu et al., "Microwave Assisted Magnetic Recording", IEEE Transactions on Magnetics, vol. 44, No. 1, Jan. 2008, pp. 125-131.

* cited by examiner

*Primary Examiner* — Jefferson Evans
(74) *Attorney, Agent, or Firm* — Thomas R. Berthold

(57) ABSTRACT

A microwave-assisted magnetic recording (MAMR) write head includes a yoke structure with a main pole, a flux return pole, and a trailing magnetic shield. The main pole includes a write pole with a tip at the disk-facing surface, a sub pole with an end recessed from the disk-facing surface and an electrically insulating layer between the write pole and the sub pole. The spin-torque oscillator (STO) is located at the disk-facing surface between the trailing shield and the write pole tip. The insulating layer assures that the STO current is not shorted between the return pole and the write pole. The insulating layer between the write pole and the sub pole increases the area of the junction between the return pole and write pole, which reduces the magnetic reluctance of the yoke structure.

12 Claims, 5 Drawing Sheets

MICROWAVE ASSISTED MAGNETIC RECORDING (MAMR) WRITE HEAD AND SYSTEM

BACKGROUND OF THE INVENTION

1. Field of the Invention

This invention relates generally to magnetic recording systems, and more particularly to a write head with a spin-torque oscillator (STO) that provides microwave-assisted magnetic recording (MAMR).

2. Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. However, an increase in recording density requires a corresponding reduction in the size of the magnetic grains in the magnetic recording layer to achieve sufficient medium signal-to-noise ratio. As the size of the magnetic grains is reduced, the magnetocrystalline anisotropy of the magnetic grains must be increased to maintain adequate thermal stability. Simultaneously, the magnetic write field from the write head has to exceed the coercivity of the magnetic recording layer to achieve saturation digital recording, resulting in a conflicted limitation on the anisotropy of the magnetic grains.

A PMR system with high-frequency assisted writing using a spin-torque oscillator (STO) has been proposed. This type of recording, also called microwave-assisted magnetic recording (MAMR), applies a high frequency oscillatory auxiliary magnetic field from the STO to the magnetic grains of the recording layer. The auxiliary field may have a frequency close to the resonance frequency of the magnetic grains in the recording layer to facilitate the switching of the magnetization of the grains at lower write fields from the conventional write head than would otherwise be possible without assisted recording. Conversely, MAMR may be used to increase the coercivity of the magnetic recording layer above that which could be written to by a conventional write head alone. The increase in coercivity afforded by MAMR allows for a reduction in the size of the magnetic grains and thus a corresponding increase in recording density system. MAMR systems are described in U.S. Pat. No. 6,785,092 B2; US 2008/0137224 A1; and by J. G. Zhu et al., "Microwave Assisted Magnetic Recording", *IEEE Transactions on Magnetics*, Vol. 44, No. 1, January 2008, pp. 125-131.

In proposed MAMR write heads, the STO is located between the write pole and the trailing magnetic shield. The STO is a multilayer film stack made up of two or more magnetic layers separated by a nonmagnetic spacer layer. One of the magnetic layers, the field generating layer (FGL), is designed to have its magnetization orientation oscillate in the presence of a direct electrical current perpendicular to the film planes of the film stack. In the presence of current above a critical current density, another magnetic layer, whose magnetization orientation preferably does not oscillate, acts as the "spin-polarizer" to produce a spin-polarized current at the FGL. This destabilizes the static equilibrium of the FGL's magnetization orientation, causing it to undergo sustained oscillation at frequencies useful for MAMR applications. The location of the STO between the write pole and the trailing shield may be the optimal location, if not the only possible location, to produce the necessary auxiliary field at the region of the recording layer where the magnetic write field from the write head is applied. Because electrical current for the STO is supplied through the magnetic yoke that surrounds the coil of the write head, there must be an insulating gap somewhere in the yoke to complete the electrical circuit. In proposed MAMR write heads, this insulating gap is located in the back region behind the coil and between a portion of the yoke and the write pole. However, this location provides a relatively narrow flux path and thus increases the magnetic reluctance of the magnetic circuit, which means that higher write current and frequency response are required to achieve the desired magnetic write field.

What is needed is a MAMR write head that provides an electrically conductive path for the STO current but with a minimal increase in magnetic reluctance so as to not require an increase in write current.

SUMMARY OF THE INVENTION

Embodiments of the microwave-assisted magnetic recording (MAMR) write head include a yoke structure with a main pole, a flux return pole, and a trailing magnetic shield. The main pole includes a write pole with a tip at the disk-facing surface, a sub pole with an end recessed from the disk-facing surface and an electrically insulating layer between the write pole and the sub pole. The spin-torque oscillator (STO) is located at the disk-facing surface between the trailing shield and the write pole tip. The insulating layer between the write pole and the sub pole assures that the STO current is not shorted between the return pole and the write pole. This assures that the yoke structure provides an electrical circuit for supply current to the STO. An electrically conductive lead may be connected to the write pole at the end recessed from the disk-facing surface. The electrically insulating layer may be formed of any suitable material, such as alumina ($Al_2O_3$), SiC, SiN, diamond-like carbon (DLC), $SiO_2$ or MgO. The separation of the main pole into the write pole and the sub pole by the electrical insulating layer increases the area of the junction between the return pole and write pole, which reduces the magnetic reluctance of the yoke structure.

For a fuller understanding of the nature and advantages of the present invention, reference should be made to the following detailed description taken together with the accompanying figures.

DETAILED DESCRIPTION OF THE INVENTION

Figure 1:
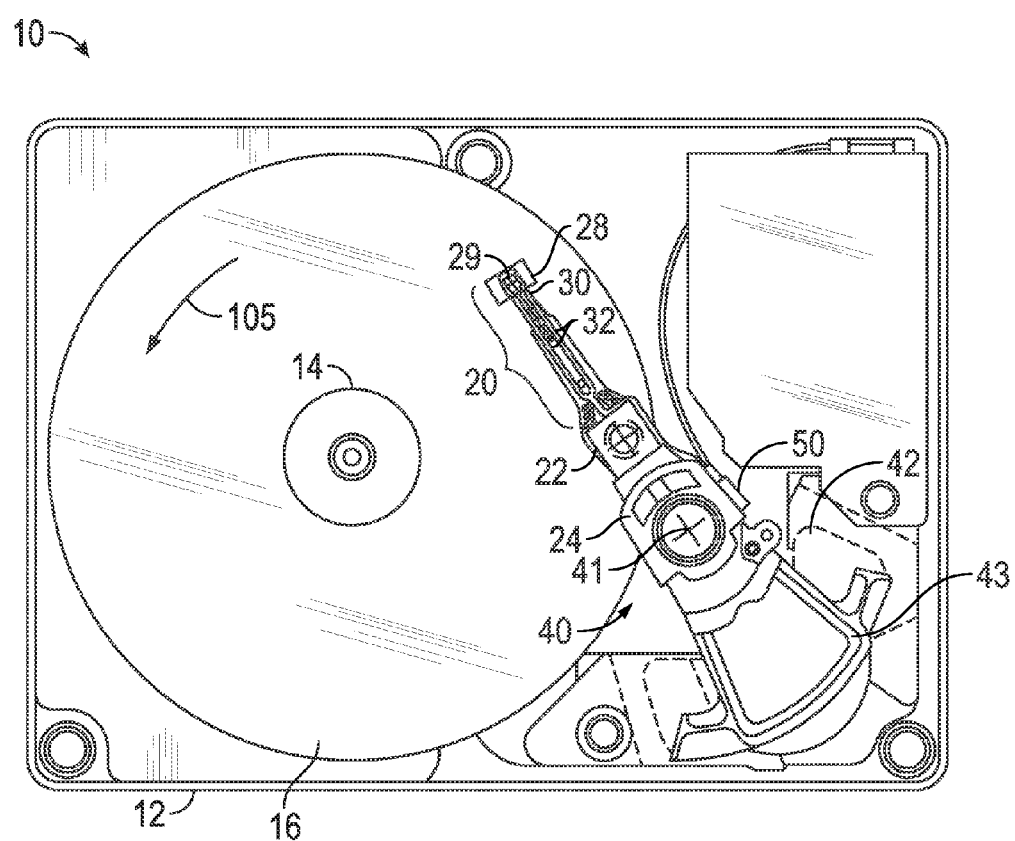
FIG. 1 is a top plan view of a hard disk drive with the cover removed for use with a microwave-assisted magnetic recording (MAMR) write head.

FIG. 1 is a top plan view of a hard disk drive 10 with the cover removed for use with a microwave-assisted magnetic recording (MAMR) write head. The disk drive 10 includes a rigid base 12 supporting a spindle 14 that supports a stack of disks, including top disk 16. The spindle 14 is rotated by a spindle motor (not shown) for rotating the disks in the direction shown by curved arrow 105. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface of slider 28, which serves as the head carrier. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
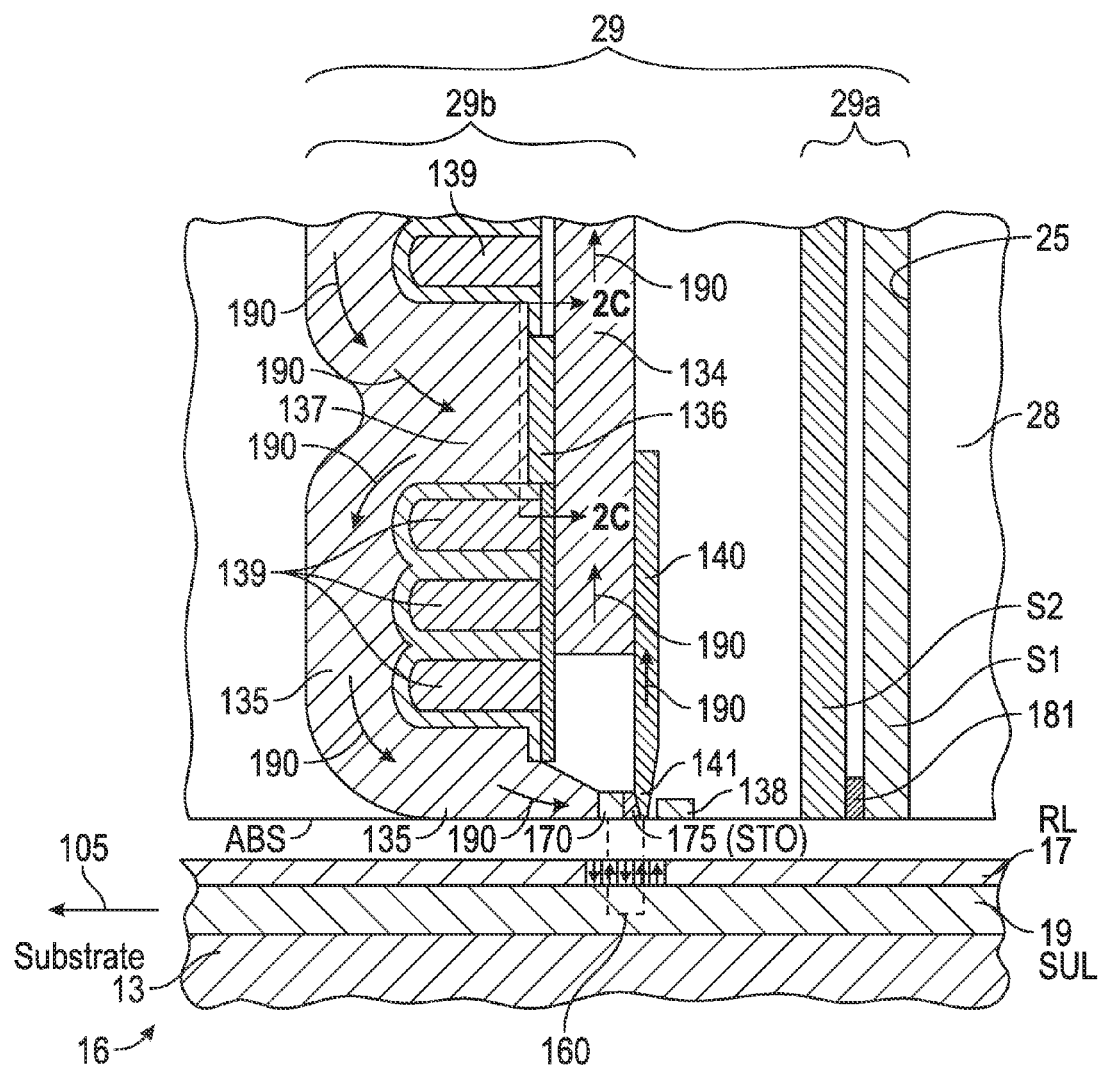
FIG. 2A is a side sectional view of a prior art perpendicular microwave-assisted magnetic recording (MAMR) write head, a read head and a recording disk taken through a central plane that intersects a data track on the disk.

FIG. 2A is a side sectional view of a prior art perpendicular MAMR write head, read head and a recording disk taken through a central plane that intersects a data track on the disk. As shown in FIG. 2A, the disk may be a "dual-layer" disk 16 that includes a perpendicular magnetic data recording layer (RL) 17 and a "soft" or relatively low-coercivity magnetically permeable underlayer (SUL) 19 formed on the disk substrate 13. A non-magnetic interlayer is typically stacked between the RL and SUL. The read/write head 29 is typically formed as a series of thin films deposited on a trailing surface 25 of air-bearing slider 28 that has its air-bearing surface (ABS) supported above the surface of disk 16. The read/write head 29 includes magnetoresistive (MR) read head 29a and MAMR write head 29b. The MR read head 29a is comprised of MR sensor 181 located between magnetic shields S1 and S2 and is deposited on the trailing end 25 of the slider 28 prior to the deposition of the layers making up the MAMR write head 29b.

The MAMR write head 29b is a single write pole type of perpendicular magnetic recording (PMR) write head and includes a yoke structure with main pole 134 that includes write pole (WP) 140 with pole tip 141, flux return pole 135, trailing magnetic shield 170, and yoke stud 137 that connects the main pole 134 and return pole 135. The MAMR write head 29b may also include a leading shield 138 at the ABS. The main pole 134, write pole 140, return pole 135, trailing shield 170 and leading shield 138 are formed of a ferromagnetic alloy, typically a NiFe, CoFe or NiFeCo alloy. An electrically insulating layer 136 is located between the yoke stud 137 and the main pole 134. The STO 175 is located substantially at the ABS between the trailing shield 170 and write pole tip 141. The write head 29b also includes a thin film coil, a section of which is shown in sections as coil 139 between the return pole 135 and the main pole 134. The write coil 139 is a "pancake" coil in which all the coil sections are in substantially the same plane and wrapped around the yoke stud 137, but alternatively the coil may be a helical coil wrapped around mail pole 134. The WP 140 is part of the main pole 134 and has a pole tip 141 substantially at the ABS that faces the outer surface of disk 16. Write current through coil 139 induces a magnetic field (shown by dashed line 160) from the WP tip 141 that passes through the RL 16 (to magnetize the region of the RL 16 beneath the WP tip 141), through the flux return path provided by the SUL 19, and back to the return pole 135. At the same time as the write field is applied to the RL 17, the STO 175 applies an auxiliary AC field to the RL 17. This results in microwave-assisted magnetic recording (MAMR), which improves the switching of the magnetization of the grains in the RL 17. The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

Figure 2B:
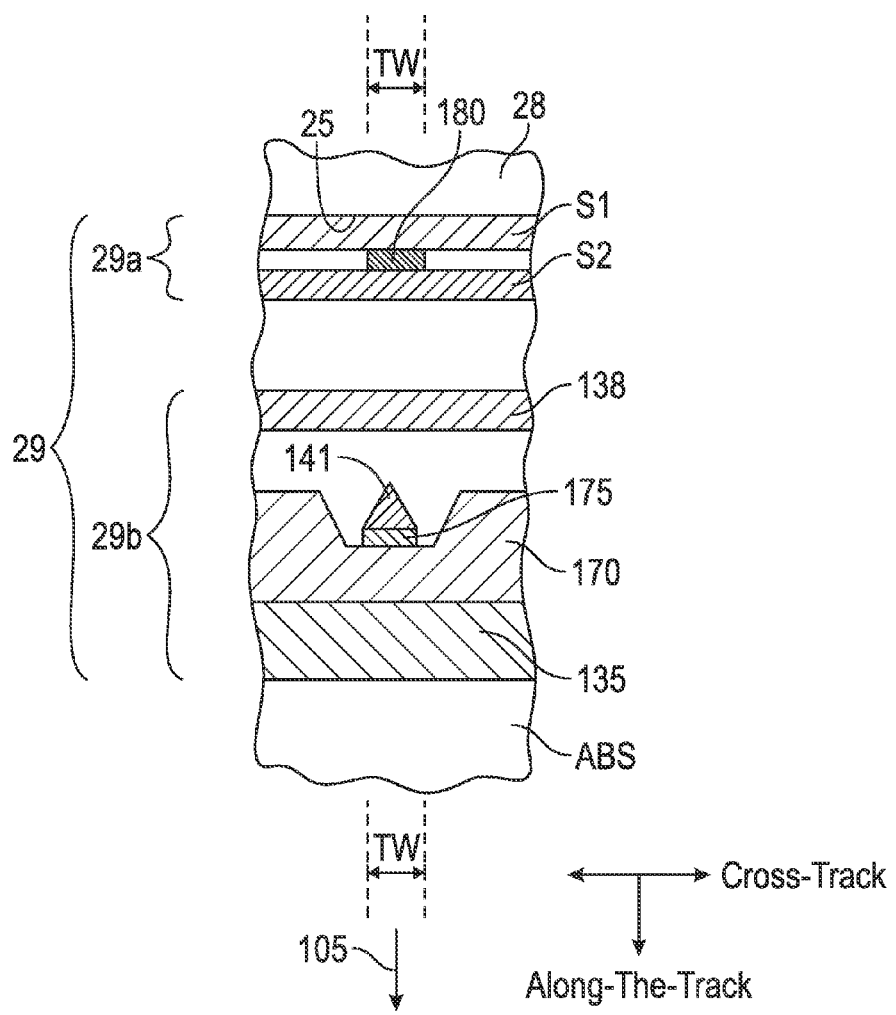
FIG. 2B is a view of the read/write head of FIG. 2A as seen from the disk.

FIG. 2B illustrates the read/write head 29 as seen from the disk 16. The ABS is the recording-layer-facing surface of the slider 28 that is generally orthogonal to the trailing surface 25 and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 105, which is called the along-the-track direction. The direction perpendicular to direction 105 and parallel to the plane of the ABS is called the cross-track direction. The width of the WP tip 141 in the cross-track direction substantially defines the track-width (TW) of the data tracks in the RL 17 (FIG. 2A). The TS 170 alters the angle of the write field as well as its gradient, and makes writing more efficient.

Figure 2C:
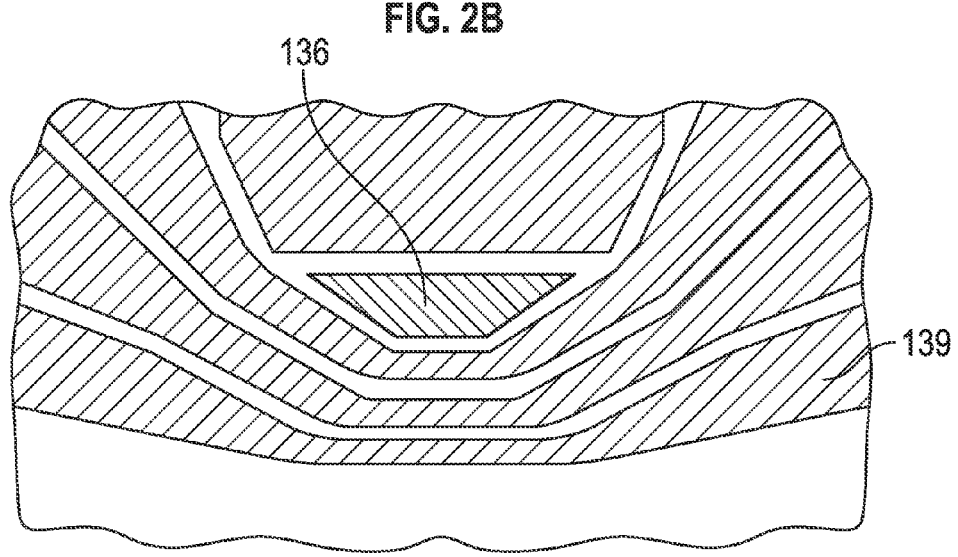
FIG. 2C is a view of section 2C-2C of FIG. 2A and depicts the shape and relative size of the insulating layer between the yoke stud and main pole in the MAMR write head according to the prior art.

The spin-torque-oscillator (STO) 175 of the MAMR write head is located between the trailing shield 170 and the WP tip 141. The STO 175 is well-known and its details are not part of this invention. STO's for MAMR are described, for example, in U.S. Pat. No. 7,982,996 B2 and US 2013/0083423 A1 and by J. G. Zhu et al., "Microwave Assisted Magnetic Recording", IEEE Transactions on Magnetics, Vol. 44, No. 1, January 2008, pp. 125-131. The electrical current source for the STO 175 is not shown but includes leads connected to the return pole 135 and the main pole 134. As shown by arrows 190 (FIG. 2A), the electrical circuit for supplying current to the STO 175 includes the return pole 135, trailing shield 170, WP 140 and main pole 134. The insulating layer 136 between the yoke stud 137 and the main pole 134 assures that current is not shorted between the return pole 135 and the main pole 134. While the location of the insulating layer 136 in the region back of the coil 139 enables the insulating layer to be relatively easily formed, the area between the yoke stud 137 and the main pole 134 is relatively small. This reduces the magnetic flux from the return pole 135 to the main pole 134, and thus increases the magnetic reluctance of the magnetic circuit. FIG. 2C is a view of section 2C-2C of FIG. 2A and depicts the shape and relative size of the insulating layer 136 between the yoke stud 137 and main pole 134.

Figure 3A:
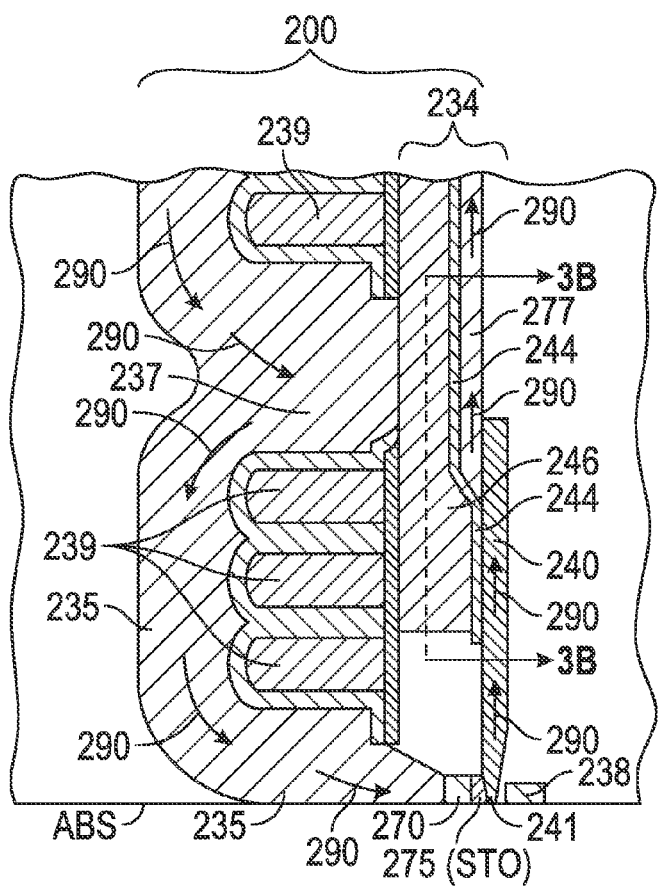
FIG. 3A is a side sectional view of a perpendicular MAMR write head according to an embodiment of this invention.
Figure 3B:
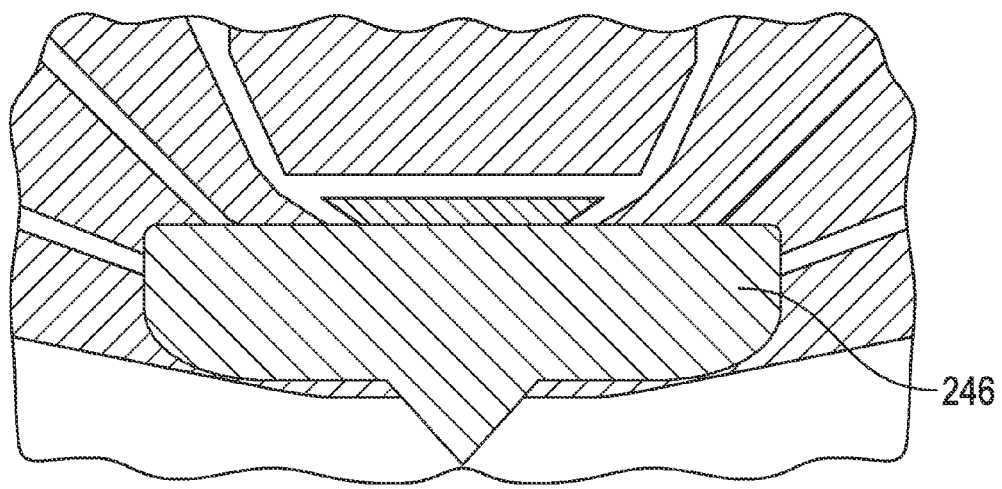
FIG. 3B is a view of section 3B-3B of FIG. 3A and depicts the shape and relative size of the insulating layer between the sub pole and write pole according to an embodiment of the MAMR write head of this invention.

An embodiment of the MAMR write head according to this invention is illustrated in FIG. 3A, which is a side sectional view taken through a central plane that intersects a data track on the disk. Portions of the MAMR write head 200 are similar to those of MAMR write head 29b in FIGS. 2A-2B. Thus the MAMR write head 200 includes a yoke structure with main pole 234 that includes write pole (WP) 240 with pole tip 241, flux return pole 235, trailing magnetic shield 270, yoke stud 237 and leading shield 238. STO 275 is located at the ABS between the trailing shield 270 and write pole tip 241. However, there is no insulating layer like layer 136 (FIG. 2A) connecting the yoke stud 237 with main pole 234. Instead the yoke stud 237 is directly connected and magnetically coupled to main pole 234. In the embodiment of this invention the main pole 234 includes write pole 240, sub pole 246 and an electrically insulating layer 244 between write pole 240 and sub pole 246. Write pole 240 and sub pole 246 are formed of a ferromagnetic alloy like a NiFe, CoFe or NiFeCo alloy. The sub pole 246 has its end that faces the ABS recessed from the ABS and is thicker than the write pole 240. The insulating layer 244 between the sub pole 246 and the write pole 240 assures that current is not shorted between the return pole 235 and the write pole 240. This assures an electrical circuit for supply current to the STO 275. An electrically conductive lead 277 is connected to the write pole 240 and between the write pole 240 and the electrically insulating layer 244. This lead 277, which may be formed of Cu, Au or Pd for example, is connected to the STO current source (not shown). Alternatively, the write pole may be directly connected to the STO current source. As shown by arrows 290, the electrical circuit for supplying current to the STO 275 includes the return pole 235, trailing shield 270, WP tip 241, write pole 240 and lead 277. The electrically insulating layer 244 may be formed of any suitable material, such as alumina ($Al_2O_3$), SiC, SiN, diamond-like carbon (DLC), $SiO_2$ or MgO. The electrically insulating layer 244 has a preferred thickness greater than or equal to 2 nm. By separating the main pole 234 into sub pole 246 and write pole 240 by the use of insulating layer 244, the area of the junction between the return pole and write pole can be increased. FIG. 3B is a view of section 3B-3B of FIG. 3A and depicts the shape and relative size of the insulating layer 246, which defines the junction between the return pole 235 and write pole 240. This junction provides a considerably larger area than the area of the junction between the yoke stud 137 and main pole 134 in the prior art of FIG. 2C. As a result the magnetic reluctance of the magnetic circuit is reduced and magnetic flux from the return pole 235 to the write pole 240 is increased.

Figure 4:
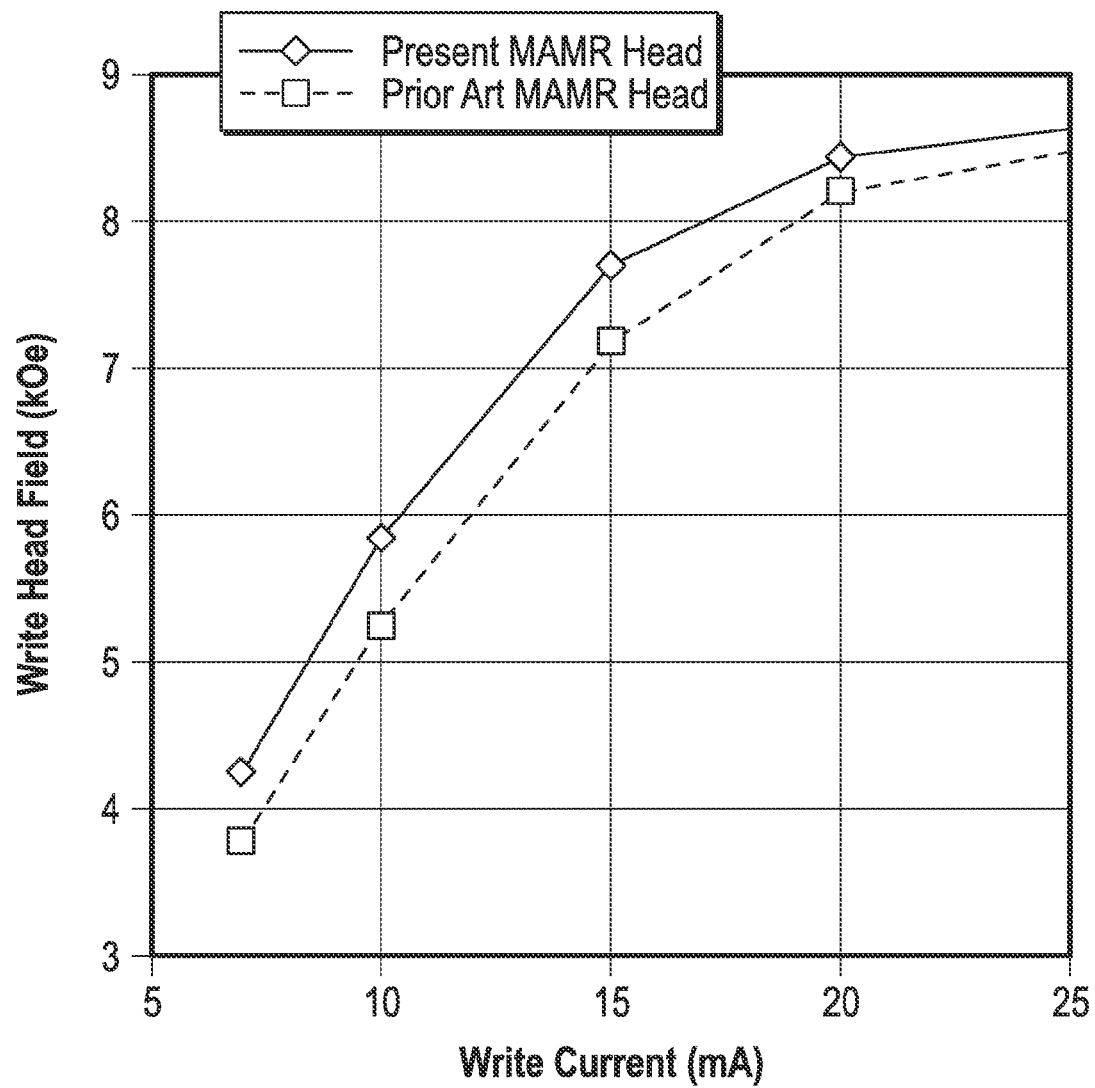
FIG. 4 is a graph of write head magnetic field as a function of write current comparing the prior art MAMR write head with the embodiment of the MAMR write head of this invention.

FIG. 4 is a graph of write head magnetic field as a function of write current comparing the prior art MAMR write head of FIG. 2A with the embodiment of the present invention shown in FIG. 3A. With the embodiment of this invention, an increase in write field of about 500 Oe can be achieved for the same write current. This means that the design write field for the MAMR write head can be achieved with substantially less write current. Lower write current is desirable since it is known that high write current levels can lead to adjacent and far track interference, i.e., overwriting of previously written data in tracks other than the track being written.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A microwave-assisted magnetic recording (MAMR) write head for magnetizing regions in a magnetic recording layer, the write head comprising:

a head carrier having a generally planar first surface and a surface for facing the recording layer that is generally orthogonal to said first surface;

a main pole on the first surface comprising a write pole having a tip substantially at the recording-layer-facing surface, a sub pole and an electrically insulating layer between the write pole and the sub pole;

a return pole having an end substantially at the recording-layer-facing surface;

a yoke stud of magnetically permeable material connecting and magnetically coupling the return pole to the sub pole, the yoke stud being in direct contact with the sub pole, wherein there is no insulating material between the yoke stud and the sub pole;

an electrically conductive pancake coil between the main pole and the return pole, the pancake coil having sections wherein all of said sections lie in substantially the same plane and are wrapped around the yoke stud;

a trailing shield substantially at the recording-layer-facing surface and magnetically coupled to the return pole; and a spin torque oscillator (STO) substantially at the recording-layer-facing surface between the trailing shield and the write pole tip;

wherein the return pole, trailing shield and write pole provide an electrically conductive path for electrical current to the STO.

2. The head of claim 1 wherein the sub pole has an end facing the recording-layer-facing surface but recessed from the recording-layer-facing surface.

3. The head of claim 1 wherein the sub pole has a thickness greater than the thickness of the write pole.

4. The head of claim 1 wherein the electrically insulating layer has a thickness greater than or equal to 2 nm.

5. The head of claim 1 wherein the electrically insulating layer is formed of a material selected from $Al_2O_3$, SiC, SiN, diamond-like carbon (DLC), $SiO_2$ and MgO.

6. The head of claim 1 further comprising an electrically conductive lead connected to the write pole at a region recessed from the recording-layer-facing surface.

7. The head of claim 1 further comprising a leading shield substantially at the recording-layer-facing surface, the write pole tip being located between the leading shield and the trailing shield.

8. A MAMR system comprising:
the write head of claim 1; and
a magnetic recording medium having a perpendicular magnetic recording layer.

9. A microwave-assisted magnetic recording (MAMR) write head for magnetizing regions in a perpendicular magnetic recording layer of a magnetic recording disk, the write head comprising:

a slider having a trailing surface and an air-bearing surface (ABS) generally orthogonal to the trailing surface;

a main pole, the main pole comprising a write pole on the trailing surface and having a tip substantially at the ABS and an end recessed from the ABS, an electrically insulating layer formed of a material selected from $Al_2O_3$, SiC, SiN, diamond-like carbon (DLC), $SiO_2$ and MgO on the write pole, and a sub pole on the insulating layer and having an end facing the ABS but recessed from the ABS;

an electrically conductive lead connected to the write pole at the end recessed from the ABS;

a return pole magnetically coupled to the sub pole and having an end substantially at the ABS;

an electrically conductive coil between the main pole and the return pole;

a trailing shield substantially at the ABS and magnetically coupled to the return pole; and a spin torque oscillator (STO) substantially at the recording-layer-facing surface between the trailing shield and the write pole tip;

wherein the return pole, trailing shield, write pole tip, write pole and electrically conductive lead provide an electrically conductive path for current to the STO.

10. The head of claim 9 wherein the sub pole has a thickness greater than the thickness of the write pole.

11. The head of claim 9 wherein the electrically insulating layer has a thickness greater than or equal to 2 nm.

12. The head of claim 9 further comprising a leading shield substantially at the ABS, the write pole tip being located between the leading shield and the trailing shield.

* * * * *